United States Patent
Uehara

(10) Patent No.: US 7,615,973 B2
(45) Date of Patent: Nov. 10, 2009

(54) ADDER AND CURRENT MODE SWITCHING REGULATOR

(75) Inventor: Osamu Uehara, Chiba (JP)

(73) Assignee: Seiko Instruments Inc. (JP)

( * ) Notice: Subject to any disclaimer, the term of this patent is extended or adjusted under 35 U.S.C. 154(b) by 68 days.

(21) Appl. No.: 12/070,083

(22) Filed: Feb. 15, 2008

(65) Prior Publication Data

US 2008/0203988 A1 Aug. 28, 2008

(30) Foreign Application Priority Data

Feb. 17, 2007 (JP) ............................... 2007-037222

(51) Int. Cl.
*G05F 3/16* (2006.01)
*G06F 7/42* (2006.01)
(52) U.S. Cl. ...................... 323/224; 323/283; 327/361
(58) Field of Classification Search ................. 327/361; 323/224, 283
See application file for complete search history.

(56) References Cited

U.S. PATENT DOCUMENTS 6,597,159 B2 *   7/2003   Yang ........................... 323/283

2002/0135345 A1   9/2002   Terashi

* cited by examiner

*Primary Examiner*—Shawn Riley
(74) *Attorney, Agent, or Firm*—Adams & Wilks

(57) ABSTRACT

Provided is an adder in which all of circuits can be constituted by CMOS transistors, a process is simplified, and a chip size can be reduced as compared with a conventional art. The adder according to the present invention includes: a first VI converter and a second VI converter that allow a current corresponding to an input voltage to flow therein; and a current addition resistor having one end commonly connected to output terminals of the first VI converter and the second VI converter and another end grounded, which is adjustable in a resistance value. Each of the first VI converter and the second VI converter includes: a prestage VI converter that generates a reference current; a poststage VI converter that generates a current corresponding to the input voltage; a first current mirror circuit whose first terminal on a reference side is connected with the prestage VI converter and whose first output terminal in which a current corresponding to the first terminal flows is connected with the poststage VI converter; and a second current mirror circuit whose second terminal on the reference side is connected to the first output terminal, and which can adjust a current ratio from a second output terminal in correspondence with the current that flows in the second terminal. A voltage at the one end of the current addition resistor is output as an addition voltage.

8 Claims, 5 Drawing Sheets

ADDER AND CURRENT MODE SWITCHING REGULATOR

BACKGROUND OF THE INVENTION

1. Field of the Invention

The present invention relates to a current mode switching regulator that controls an output voltage on the basis of the detected values of the output voltage and an output current by the aid of a DC input power supply, and an adder used for the switching regulator.

2. Description of the Related Art

A circuit structured as shown in FIG. 6 is used for a current mode step-down switching regulator (for example, refer to JP 2002-281742 A).

In the circuit, when a switch 107 is turned on, a current flows into a coil 108 from a power supply with the result that an input voltage Vi is accumulated in the coil 108 as an electric energy (that is, electric charges), and also accumulated in an output capacitor 112. Also, when the switch 107 is turned off, the electric energy that has been accumulated in the output capacitor 112 is discharged through a load.

Accordingly, in the current mode step-down switching regulator shown in FIG. 6, a voltage obtained by averaging (integrating) the electric energy that has been accumulated in the coil 108 by the output capacitor 112 is applied to the load.

An error amplifier 101 inputs a detection voltage obtained by dividing the output voltage by the aid of a resistor 110 and a resistor 111 at an inverting input terminal thereof, inputs a reference voltage Vref that has been output from a reference voltage source 100 at a non-inverting input terminal thereof, amplifies a difference between the detection voltage and the reference voltage Vref, and outputs the amplified result to the inverting input terminal of a comparator 105 as a detected amplification voltage.

An I/V circuit 121 detects a current that flows in the coil 108, generates a voltage corresponding to the detected current, and outputs the generated voltage to one input terminal of an adder 103.

An I/V circuit 122 detects a current that flows in the load, generates a voltage corresponding to the detected current, and outputs the generated voltage to another input terminal of the adder 103.

The adder 103 adds the voltages that are input from one input terminal and another input terminal together, and outputs the added result to the non-inverting input terminal of the comparator 105 as a compensation voltage.

That is, the compensation voltage is obtained by detecting currents that flow in the respective elements by the aid of a detector that is connected in series with the load or the coil 108, converting values proportional to the current values of the currents in the load or the coil 108 into voltage values, and adding those voltage values together by the adder 103.

The comparator 105 inputs the detected amplification voltage at an inverting input terminal thereof, inputs the compensation voltage at the non-inverting input terminal, compares the detected amplification voltage with the compensation voltage, and outputs the comparison result to a reset terminal R of an SR-latch 106 as a control signal. For that reason, the detected amplification voltage that is output by the error amplifier 101 increases more as the output voltage increases more. In the case where the detected amplification voltage exceeds the compensation voltage, the comparator 105 changes the control signal from H level to L level. On the other hand, in the case where the detected amplification voltage is lower than the compensation voltage, the comparator 105 changes the control signal from L level to H level.

Accordingly, when the SR-latch 106 inputs a clock signal of a given period to a set terminal thereof from an oscillator 104, and the SR-latch 106 changes the switch signal to H level when the SR-latch 106 is set. When the SR-latch 106 inputs a control signal of H level, the SR-latch 106 resets the output, and changes the switch signal to L level. The switch 107 is turned on when the input switch signal is H level, and turned off when the input switch signal is L level.

As described above, the current mode step-down switching regulator controls the duty of the switch signal which controls the on/off state of the switch 107 because the switching regulator generates the output voltage according to feedback information on both of the output voltage and the output current.

However, in the conventional example, in the case where the adder 103 and a slope compensation circuit 102 that generates a compensation lamp wave that is input to the adder 103 are formed of CMOS, the gains of the amplifiers in the respective circuits vary due to a variation in a threshold voltage, and the compensation lamp wave and the characteristic of the adder 102 are different in each of the chips, and the characteristics of the switching regulator are different from the designed values.

For that reason, in the conventional art, the variation in the gain as described above is suppressed, and a current corresponding to the voltage of the compensation lamp wave and a sense voltage corresponding to a current that flows in the coil 108 are added together, and a slope compensated sense voltage is generated. Therefore, the adder 103 is formed of a bipolar transistor or a bi CMOS transistor (a mixture of the bipolar transistor and the CMOS transistor) shown in FIG. 7 (JP 2002-281742 A).

However, in the case where the respective circuits including the adder 103 are formed of the bipolar transistor or the bi CMOS transistor, there is a disadvantage in that a manufacturing process gets complicated as compared with the CMOS, and miniaturization cannot be conducted with the result that the chip size cannot be reduced.

SUMMARY OF THE INVENTION

The present invention has been made in view of the above circumstances, and therefore an object of the present invention is to provide an adder that can be completely formed of complementary metal oxide semiconductor (CMOS), and simplified in process and reduced in chip size as compared with the conventional art.

According to the present invention, there is provided an adder that converts a plurality of input voltages into currents, adds the currents obtained, converts the current added into a voltage, and outputs the voltage as an added result (in an embodiment of the present invention, an adder that adds a sense voltage corresponding to a current value of a coil current that flows in a coil and a voltage of a compensation lamp waveform used for slope compensation in a current mode switching regulator), including: a first VI converter that allows a first current corresponding to a voltage value of a first input voltage to flow; a second VI converter that allows a second current corresponding to a voltage value of a second input voltage to flow; and a current addition resistor having one end commonly connected to output terminals of the first VI converter and the second VI converter and another end grounded, which is adjustable in a resistance value, in which each of the first VI converter and the second VI converter includes: a prestage VI converter that generates a reference current (a prestage VI converter 61 or a prestage VI converter 63 in the embodiment of the present invention); a poststage VI converter that generates a current corresponding to an input voltage (a poststage VI converter 62 or a poststage VI converter 64 in the embodiment of the present invention); a first current mirror circuit (a first or third current mirror circuit in the embodiment of the present invention) having a first terminal on a reference side connected with the prestage VI converter and a first output terminal in which a current corresponding to the first terminal (a drain of an n-channel transistor M4 or M24 in the embodiment of the present invention) flows connected with the poststage VI converter; and a second current mirror circuit (a second or fourth current mirror circuit in the embodiment of the present invention) having a second terminal (a drain of an n-channel transistor M7 or M27 in the embodiment of the present invention) on a reference side connected with the first output terminal, which can adjust a ratio of a current that flows from a second output terminal in correspondence with a current that flows in the second terminal, and in which the first current and the second current are allowed to flow to output a voltage generated on the one end of the current addition resistor as an addition voltage resulting from adding the first input voltage and the second input voltage together.

The adder according to the present invention has a detector circuit that detects the voltage at the second terminal of any one of the first VI converter and the second VI converter.

In the adder according to the present invention, in the first VI converter and the second VI converter, the prestage VI converter includes: a first p-channel transistor (a p-channel transistor M3 in the embodiment of the present invention) having a source connected with a first constant current source and a gate and a drain grounded; and a first n-channel transistor (an n-channel transistor M4 in the embodiment of the present invention) having a gate connected to the source of the first p-channel transistor and a source grounded through a resistor, the poststage VI converter includes: a second p-channel transistor (an p-channel transistor M6 in the embodiment of the present invention) having a source connected with a second constant current source, a gate applied with the input voltage, and a drain grounded; and a second n-channel transistor (a n-channel transistor M7 in the embodiment of the present invention) having a gate connected to the source of the second p-channel transistor and a source grounded through a resistor, the first current mirror circuit includes: a third p-channel transistor (a p-channel transistor M5 in the embodiment of the present invention) having a source connected to a power supply, and a gate and a drain connected to a drain of the first n-channel transistor; and a fourth p-channel transistor (a p-channel transistor M8 in the embodiment of the present invention) having a source connected to the power supply, a gate connected to the gate of the third p-channel transistor, and a drain connected to a drain of the second n-channel transistor, and the second current mirror circuit includes: a fifth p-channel transistor (a p-channel transistor M9 in the embodiment of the present invention) having a source connected to the power supply and a gate and a drain connected to the drain of the second n-channel transistor; and a sixth p-channel transistor (a p-channel transistor M10 in the embodiment of the present invention) having a source connected to the power supply, a gate connected to the gate of the fifth p-channel transistor, and a drain connected to one end of an adjustment resistor, which can adjust an amount of current.

In the adder according to the present invention, the detector circuit includes a seventh p-channel transistor having a source connected to a power supply, a gate connected to the gate of the sixth p-channel transistor, and a drain grounded through a resistor.

According to the present invention, there is also provided a current mode switching regulator including: a slope compensation circuit that outputs a compensation lamp waveform for slope compensation; a current detector circuit that detects a current that is supplied to a load to generate a sense voltage corresponding to the current; an adder that adds a voltage of the compensation lamp waveform and the sense voltage together to generate a compensation sense voltage that has been subjected to slope correction; and an output voltage control circuit that controls an output voltage by the compensation sense voltage, in which any one of the adders described above is employed as the adder.

With the structure described above, according to the present invention, in the case where the added results that are output by the respective transistors that constitute the prestage VI converter, the poststage VI converter, the first current mirror circuit, and the second current mirror circuit in the first VI converter and the second VI converter are varied due to a variation in the threshold voltage in the process, the amount of current is adjusted, thereby making it possible to suppress a variation caused by the threshold voltage in the adjustment resistor and/or the adjustable second current mirror circuit. As a result, all of the transistors can be formed with the CMOS structure instead of structuring the transistors by the bipolar transistors or the bi CMOS transistors as in the conventional art. Also, the process of the current mode switching regulator semiconductor device is simplified, the chip size can be reduced, and the manufacturing costs can be reduced.

As a result, according to the present invention, by using the above-mentioned adder, there can be inexpensively structured the current mode switching regulator which is capable of adding the sense voltage corresponding to the current that flows in the coil and the voltage of the compensation lamp waveform together without any variation between the chips, and outputting the output voltage corresponding to the load at a high speed and with a high precision.

DETAILED DESCRIPTION OF THE PREFERRED EMBODIMENTS

Figure 1:
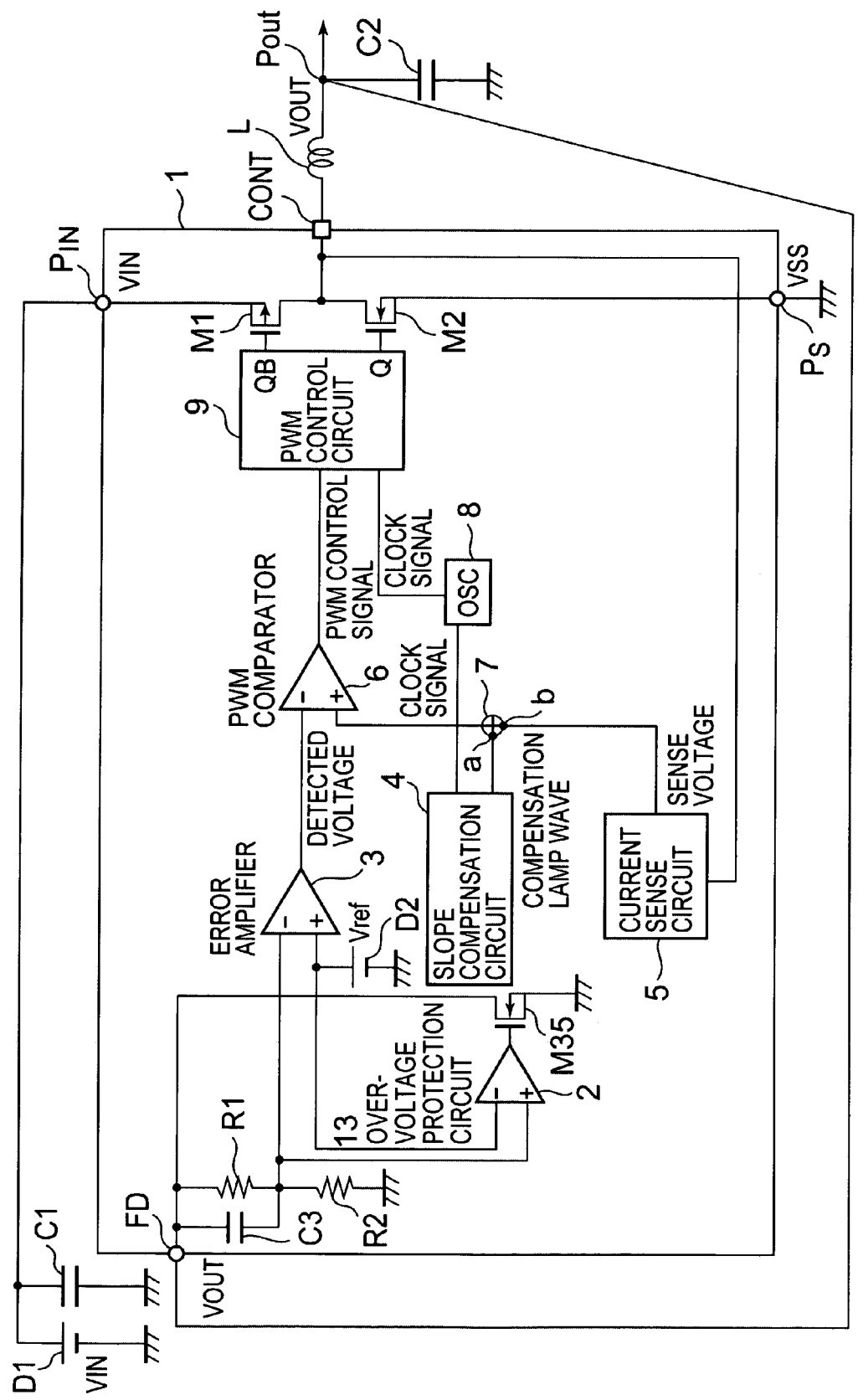
FIG. 1 is a conceptual diagram showing a structure example of a current mode switching regulator using an adder according to an embodiment of the present invention.

Hereinafter, a description will be given of a current mode step-down switching regulator semiconductor device 1 using a current sense circuit 5 according to a embodiment of the present invention with reference to the accompanying drawings. FIG. 1 is a block diagram showing a structure example of the current mode step-down switching regulator according to the embodiment of the present invention. The most characteristic structure of the present invention resides in an adder 7 that adds the voltage of the compensation lamp wave and the sense voltage that is output by the current sense circuit 5 in order to generate a voltage that controls the output voltage Vout which is output from the output terminal Pout, and its details will be described.

In the figure, the current mode step-down switching regulator according to this embodiment is made up of a current mode step-down switching regulator semiconductor device 1, a coil L used for voltage conversion (step-down in this embodiment), and a smoothing capacitor C2 that smoothes the voltage that is output from the coil L. When a p-channel MOS transistor (hereinafter, referred to as "p-channel transistor") M1 is turned on, and an n-channel MOS transistor (hereinafter, referred to as "n-channel transistor") M2 is turned off, a current flows in a coil L from a power supply D1 through a terminal Pin and an output terminal (CONT terminal), and an input voltage Vin that is a voltage of the power supply D1 is accumulated in the coil L as an electric energy (that is, electric charges). Also, when the p-channel transistor M1 is turned off, and the n-channel transistor M2 is turned on, the electric energy that has been accumulated in the coil L is discharged. A capacitor C1 is connected between the output terminal of the power supply D1 and a ground point.

The p-channel transistor M1 has a source connected to the terminal Pin, that is, the source connected to the power supply D1 through the terminal Pin, and the n-channel transistor M2 has a source connected to a terminal Ps, that is, the source grounded through the terminal Ps. The other respective circuits of an overvoltage protection circuit 13, an error amplifier 3, a slope compensation circuit 4, a current sense circuit 5, a PWM comparator 6, an adder 7, an oscillator 8, a PWM control circuit 9, and an OR circuit 12 are connected to the power supply D1 through the terminal Pin, and connected to the ground point through the terminal Ps.

Accordingly, in the current mode step-down switching regulator, the output voltage Vout that is output to the load from the output terminal Pout is adjusted between a period during which the electric energy is accumulated in the coil L and a period during which the electric energy is discharged from the coil L, and the output voltage Vout that has been averaged (integrated) by the coil L and the capacitor C2 is supplied to the load.

The p-channel transistor M1 has a drain connected to the drain of the n-channel transistor M2 and a terminal CONT (series connection), and the coil L has one end connected to the terminal CONT, and another end thereof connected to the load (that is, output terminal Pout) Also, the p-channel transistor M1 has a gate connected to a terminal QB of a PWM control circuit 9, and the n-channel transistor M2 has a gate connected to a terminal Q of the PWM control circuit 9.

The error amplifier 3 has an inverting terminal input with a voltage at the output terminal which is a connection point between a capacitor C2 and the coil L, that is, a divided voltage resulting from dividing the output voltage Vout by a resistor R1 and a resistor R2 (a series-connected divider circuit), and a non-inverting terminal input with a reference voltage Vref that is output by a reference power supply D2 to amplify a difference between the divided voltage and the reference voltage Vref. The error amplifier 3 outputs the amplified result to the inverting input terminal of the PWM comparator 6 as a detected voltage. Also, a phase control capacitor C3 is inserted between a terminal FD that is input with the output voltage Vout and the connection point between the resistor R1 and the resistor R2.

In the output voltage Vout that is output by the switching regulator, a target voltage that is a target value of the voltage that is applied to the load is set as the reference voltage Vref of the reference power supply D2 connected to the error amplifier 3. That is, in this embodiment, the definition of the target voltage represents a voltage set as a control target that is given to the load of the output voltage. In the error amplifier 3, the reference voltage is a voltage that is compared with the divided voltage resulting from dividing the output voltage by the divider circuit as already described above, and the divided voltage obtained when the output voltage coincides with the target voltage is set. Accordingly, in the case where the divided voltage resulting from dividing the output voltage by the divider circuit exceeds the reference voltage, the output voltage exceeds the target voltage.

The slope compensation circuit 4 generates a sawtooth compensation lamp wave (voltage waveform that sequentially changes into a linear shape by a slope m which will be described later) in synchronism with a period T of the frequency of the clock signal that is oscillated by the oscillator 8, and outputs the compensation lamp wave to an input terminal "a" of the adder 7.

The current sense circuit 5 detects a current value of a current that flows in the coil L, that is, detects a current variation in correspondence with a variation in the load capacity, generates a sense voltage (corresponding to the current value of a current that flows in the coil) S1, and outputs the sense voltage S1 to the input terminal "b" of the adder 7. The sense voltage is subjected to slope compensation (correction) by the voltage of the compensation lamp wave which is output by the slope compensation circuit 4.

In this example, because the output voltage Vout changes in correspondence with a change in the current that flows in the coil L, the sense voltage corresponding to the current change of the current that flows in the coil L is obtained with respect to the voltage value of the compensation lamp wave of the slop compensation, and the sense voltage is fed back to the compensation lamp wave to conduct high-precision control as described later.

That is, a period during which the p-channel transistor M1 is turned on is adjusted in correspondence with the current that flows in the coil L. Accordingly, because the sense voltage corresponding to the current that flows in the coil L is slope-compensated by the voltage of the compensation lamp wave, and the output voltage is determined by the current that flows in the coil L (primary information), a response speed of the control with respect to the load change becomes high.

As described above, the adder 7 adds a voltage value of the compensation lamp wave that is output by the slope compensation circuit 4 (input to the input terminal "a") and a sense voltage that is output from the current sense circuit 5 (input to an input terminal "b") together to slope-compensate a sense voltage corresponding to the current that flows in the coil L by the compensation lamp wave to output the compensated sense voltage to the non-inverting input terminal of the PWM comparator 6.

Figure 2:
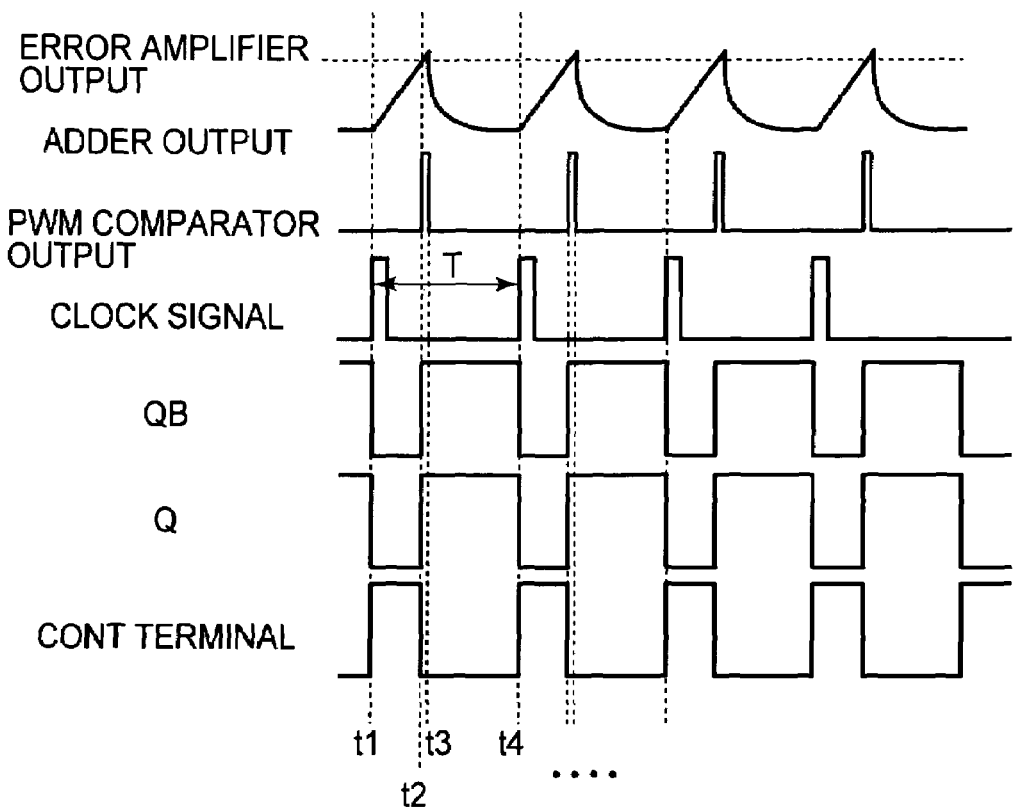
FIG. 2 is a waveform for explaining the operation of the current mode switching regulator shown in FIG. 1.

The PWM comparator 6 compares the detected voltage that is output from the error amplifier 3 with the voltage value of the slope-compensated sense voltage which is input from the adder 7, and outputs the PWM control signal as a pulse of H level when the voltage value of the compensation lamp wave exceeds the detected voltage as shown in FIG. 2.

The oscillator 8 periodically outputs clock signals (pulses of H level) in a predetermined period T.

As shown in FIG. 2, the PWM control circuit 9 applies a voltage of H level to the gate of the p-channel transistor M1 through the output terminal QB to turn on the p-channel transistor M1, and applies a voltage of L level to the gate of the n-channel transistor M2 through the output terminal Q to turn off the n-channel transistor M2, in synchronism with a leading edge of the clock signal.

Further, the PWM control circuit 9 applies a voltage of L level to the gate of the p-channel transistor M1 through the output terminal QB to turn off the p-channel transistor M1, and applies a voltage of H level to the gate of the n-channel transistor M2 through the output terminal Q to turn on the n-channel transistor M2, in synchronism with a leading edge of the PWM control signal (pulse of H level).

The overvoltage protection circuit 2 has a non-inverting input terminal input with the divided voltage, and an inverting input terminal input with the reference voltage Vref. When the output voltage exceeds a predetermined voltage, that is, the divided voltage corresponding to the output voltage exceeds the reference voltage Vref, the overvoltage protection circuit 2 turns on a n-channel transistor M35 to drop the output voltage Vout for load protection and the protection of the semiconductor device 1.

In the above slope compensation, there has been known that when the current that flows in the coil operates in the duty cycle of continuous 50% or higher at a continuous mode in the current mode switching regulator, oscillation occurs in the cycle of integer times of the switching frequency, that is, sub-harmonic oscillation occurs. In this example, an up slope of the current that flows in the coil is determined according to the input voltage Vin and the inductance value of the coil L, and a down slope of the current that flows in the coil is determined according to the energy consumption of the load which is connected to the output terminal.

Figure 3:
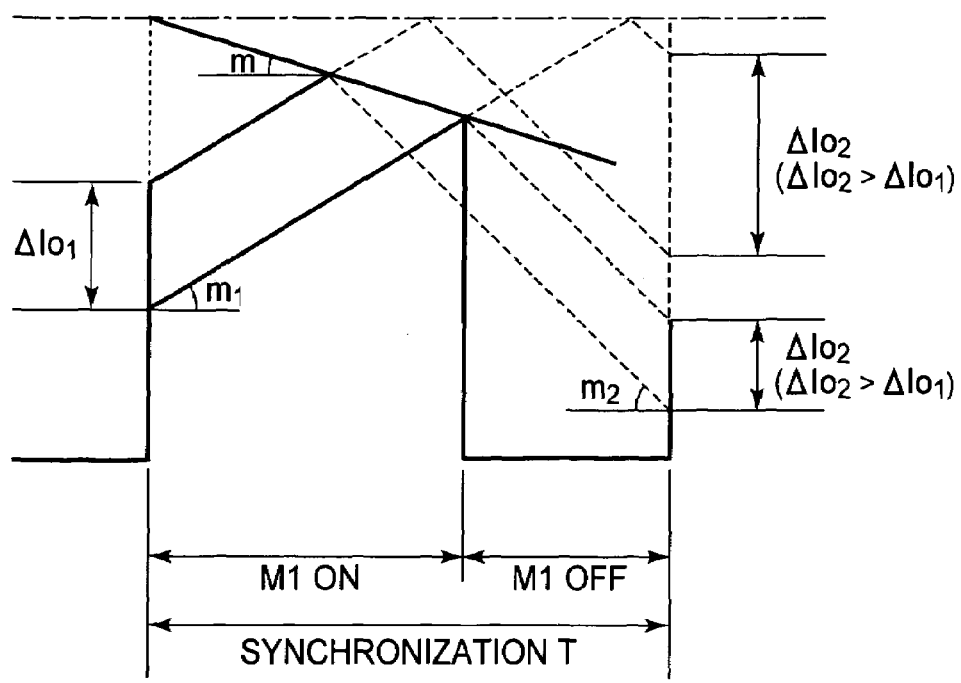
FIG. 3 is a waveform for explaining the operation of slope compensation in the current mode switching regulator shown in FIG. 1.

Even in the same cycle, the duty of switching on/off of the p-channel transistor M1 and the n-channel transistor M2 frequently vary. As shown in FIG. 3, when a current IL that flows in the coil starts from a point shifted by ΔIo, ΔIo1<ΔIo2 is satisfied in the subsequent cycle, the current value that starts gradually increases, and the operation is stabilized in a certain cycle. As a result, the sub-harmonic oscillation occurs.

Conversely, when control is conducted so that the shifted current satisfies ΔIo1>ΔIo2, that is, the current Io that starts gradually decreases, the change is gradually converged to stabilize the operation.

For that reason, in order to reduce the start current in the subsequent cycle, the above slope compensation is required so that the coil current that causes the sub-harmonic oscillation stably operates even in the duty cycle of continuous 50% or higher.

In order to conduct the stable operation, a slope m of an up line of the slope compensation needs to be represented by the following expression so as to satisfy Δio1>Δio2 generally in the case of the current mode step-down switching regulator.

$$m \geq (m2-m1)/2 = (2Vout-Vin)/2L$$

where m2 is a slope of the down slop of the coil current, that is, a current decrease rate, which is presented by the following expression.

$$m2 = (Vout-Vin)/L$$

Also, m1 is a slope of the up slop of the coil current, that is, a current increase rate, which is presented by the following expression.

$$m1 = Vin/L$$

The slope compensation circuit 4 outputs the compensation lamp wave of the sawtooth slope compensation having the above slopes of m in synchronism with the clock signal that is output by the oscillator 8.

Figure 4:
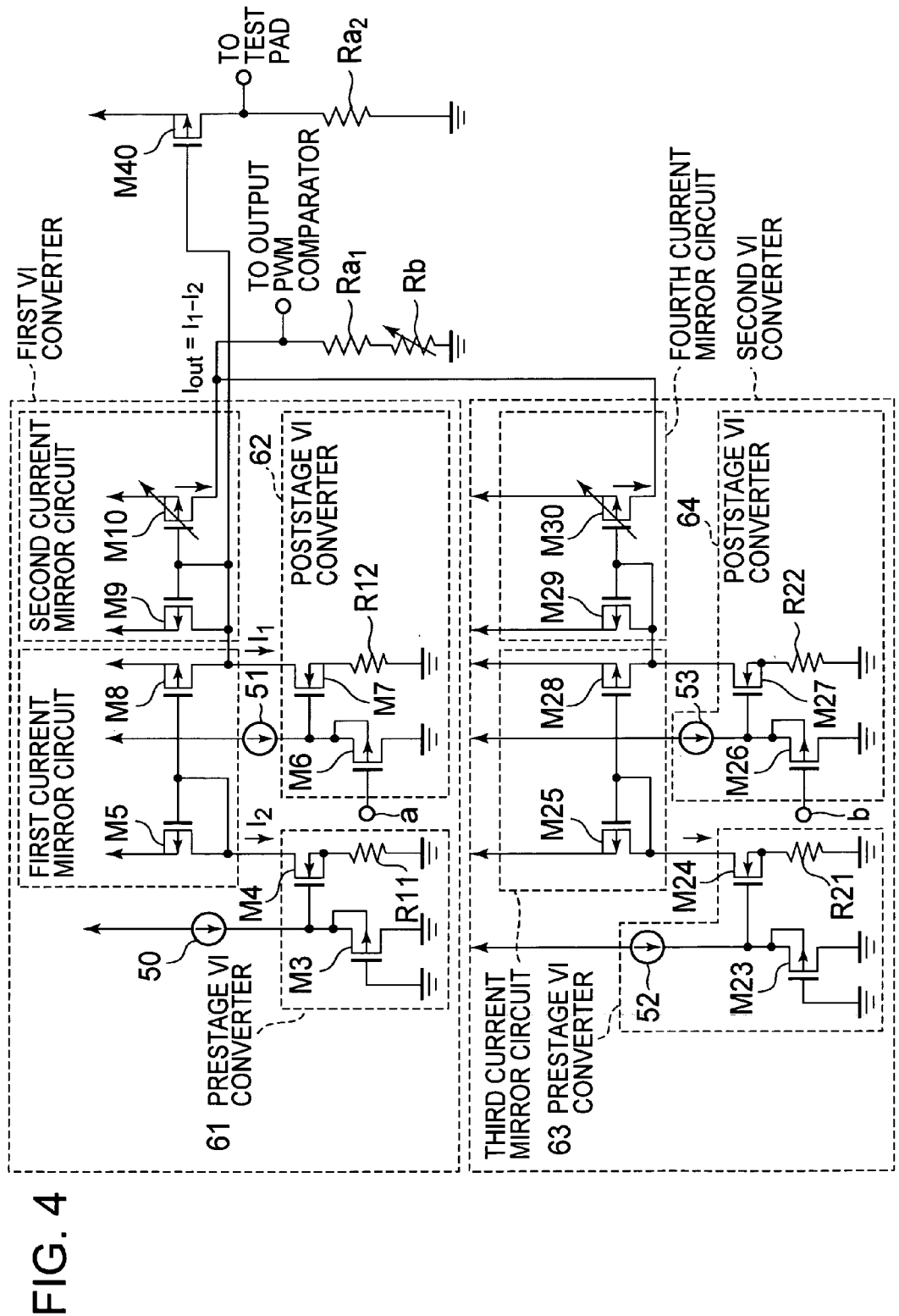
FIG. 4 is a conceptual diagram showing a structure example of an adder (7) in the current mode switching regulator shown in FIG. 1.

Subsequently, a description will be given of the adder 7 according to the embodiment of the present invention in detail with reference to FIG. 4. FIG. 4 is a conceptual diagram showing a structural circuit example of the adder 7 according to this embodiment.

The adder 7 is made up of p-channel transistors M3, M5, M6, M8, M9, M10, M23, M25, M26, M28, M29, M30, and M40, n-channel transistors M4, M7, M24, and M27, resistors R11, R12, R21, R22, Ra1, Ra2, and Rb, and constant current sources 50, 51, 52, and 53.

The p-channel transistor M3, the n-channel transistor M4, and the resistor R11 constitute a prestage (first sub) VI converter, and the p-channel transistor M6, the n-channel transistor M7, and the resistor R12 constitute a poststage (second sub) VI converter. In this example, the resistors R11 and R12 have the same resistance.

Also, the p-channel transistors M5 and M8 constitute a first current mirror circuit, and the p-channel transistors M9 and M10 constitute a second current mirror circuit.

Likewise, the p-channel transistor M23, the n-channel transistor M24, and the resistor R21 constitute a prestage (third sub) VI converter, and the p-channel transistor M26, the n-channel transistor M27, and the resistor R22 constitute a poststage (fourth sub) VI converter. In this example, the resistors R21 and R22 have the same resistance.

Also, the p-channel transistors M25 and M28 constitute a third current mirror circuit, and the p-channel transistors M29 and M30 constitute a fourth current mirror circuit.

Also, the prestage VI converter 61, the poststage VI converter 62, the first current mirror circuit, and the second current mirror circuit constitute a first VI converter, and the prestage VI converter 63, the poststage VI converter 64, the third current mirror circuit, and the fourth current mirror circuit constitute a second VI converter.

The resistor Ra1 and the resistor Rb constitute an adjustment resistor, and the p-channel transistor M40 and the resistor Ra2 constitute a detector circuit.

The p-channel transistor M3 has a source connected to a power supply (Vin) wiring through the constant current source 50, and a gate and a source grounded.

The n-channel transistor M4 has a gate connected to the source of the p-channel transistor M3, and a source grounded through the resistor R11.

The p-channel transistor M5 has a source connected to the power supply wiring, and a connection point (reference side) of a gate and a drain connected to the drain of the n-channel transistor M4.

The p-channel transistor M8 has a source connected to the power supply wiring, a gate connected to the gate of the p-channel transistor M5, and a drain as an output terminal.

The p-channel transistor M6 has a source connected to a power supply wiring through the constant current source 51, a gate connected to the input terminal "a", and a source grounded.

The n-channel transistor M7 has a gate connected to the source of the p-channel transistor M6, and a source grounded through the resistor R12.

The p-channel transistor M9 has a source connected to the power supply wiring, and a connection point (reference side) of a gate and a drain connected to the drain of the n-channel transistor M7.

The p-channel transistor M10 has a source connected to the power supply wiring, a gate connected to the gate of the p-channel transistor M9, and a drain as an output terminal.

Figure 5A:
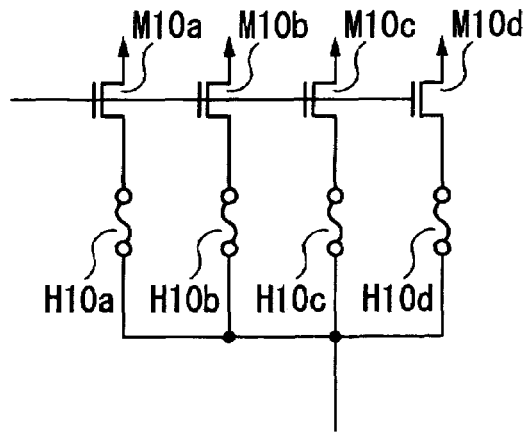
FIGS. 5A and 5B are conceptual diagrams showing a structure example of a p-channel transistor (M10 (or M30)) and a resistor (Rb) in FIG. 4.

In this example, the p-channel transistor M10 is so structured as to set the current capacity (rated current value) arbitrarily by the aid of a trimming technique in the manufacturing process. For example, as shown in FIG. 5A, the p-channel transistor M10 has p-channel transistors M10a, M10b, M10c, and M10d, and the respective p-channel transistors have a common source, a common gate, and a common drain. Fuses H10a, H10b, H10c, and H10d are disposed between the drains of the respective p-channel transistors and a connection point at which the respective drains are commonly connected to each other, respectively. In this example, the p-channel transistors M10a, M10b, M10c, and M10d are formed at the current ratio of 1:2:4:8, respectively, and the fuses H10a to H10d are trimmed by laser to adjust the current capacity. An initial composite current capacity in which the transistors are connected in parallel is set to an intermediate value of an adjustable range to conduct a wide adjustment. With the above adjustment, the ratio of the current that flows in the drain of the p-channel transistor M10 can be adjusted in correspondence with the current from the drain of the p-channel transistor M9. That is, the second current mirror circuit is adjusted by trimming, thereby making it possible to absorb the variation in the respective transistors in the prestage VI converter 61, the poststage VI converter 62, and the first current mirror circuit.

The p-channel transistor M23 has a source connected to a power supply through the constant current source 52, and a gate and a source grounded.

The n-channel transistor M24 has a gate connected to the source of the p-channel transistor M23, and a source grounded through the resistor R21.

The p-channel transistor M25 has a source connected to the power supply wiring, and a gate and a drain (reference side) connected to the drain of the n-channel transistor M24.

The p-channel transistor M28 has a source connected to the power supply wiring, a gate connected to the gate of the p-channel transistor M25, and a drain as an output terminal.

The p-channel transistor M26 has a source connected to a power supply wiring through the constant current source 53, a gate connected to the input terminal "b", and a source grounded.

The n-channel transistor M27 has a gate connected to the source of the p-channel transistor M26, and a source grounded through the resistor R22.

The p-channel transistor M29 has a source connected to the power supply wiring, and a gate and a drain (reference side) connected to the drain of the n-channel transistor M27.

The p-channel transistor M30, which has the same structure as that of the p-channel transistor M10, has a source connected to the power supply wiring, a gate connected to the gate of the p-channel transistor M29, and a drain as an output terminal.

Subsequently, as a current adder circuit that conducts current addition and converts the addition result into a voltage, there is provided a resistor circuit having a series connection of the resistor Ra1 and the resistor Rb. The resistor circuit adds the current resulting from converting the respective voltages input from the input terminals "a" and "b" of the adder 7, that is, the sense voltage S1 and the voltage of the compensation lamp wave into currents by the first and second VI converters together, and resultantly outputs the sense voltage S1 as the voltage value that has been subjected to the slope compensation by the voltage of the compensation lamp wave.

In this example, the resistor Ra1 has one end commonly connected to the drains of the p-channel transistors M10 and M30 (output terminals of the current mirror circuit), and another end connected to one end of the resistor Rb. The resistor Rb has one end connected to the resistor Ra1, and another end grounded. That is, the resistor Rb is connected in series with the resistor Ra1, and is inserted between the drains of the p-channel transistors M10 and M30 and the connection point.

Figure 5B:
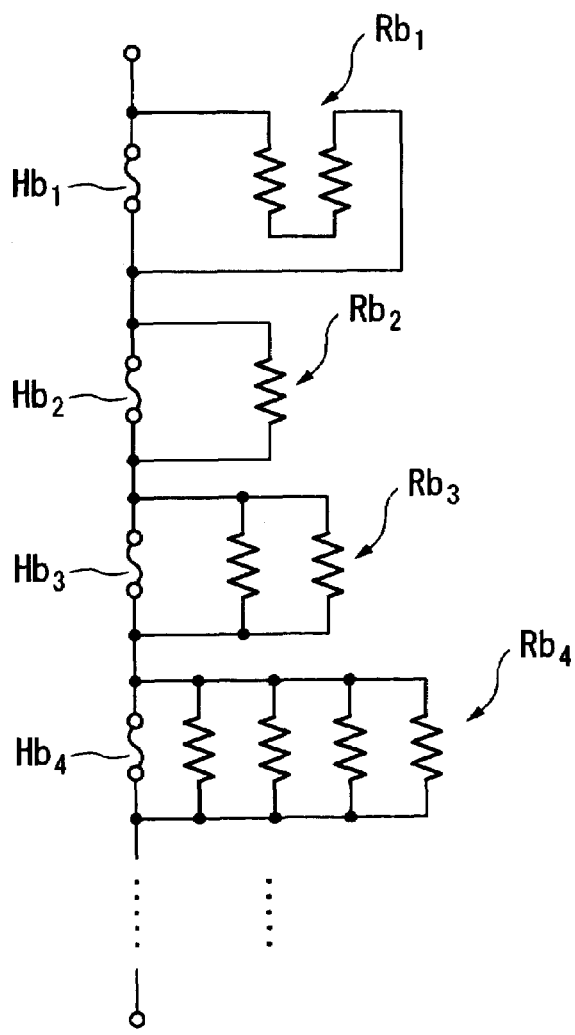
Figure 7:
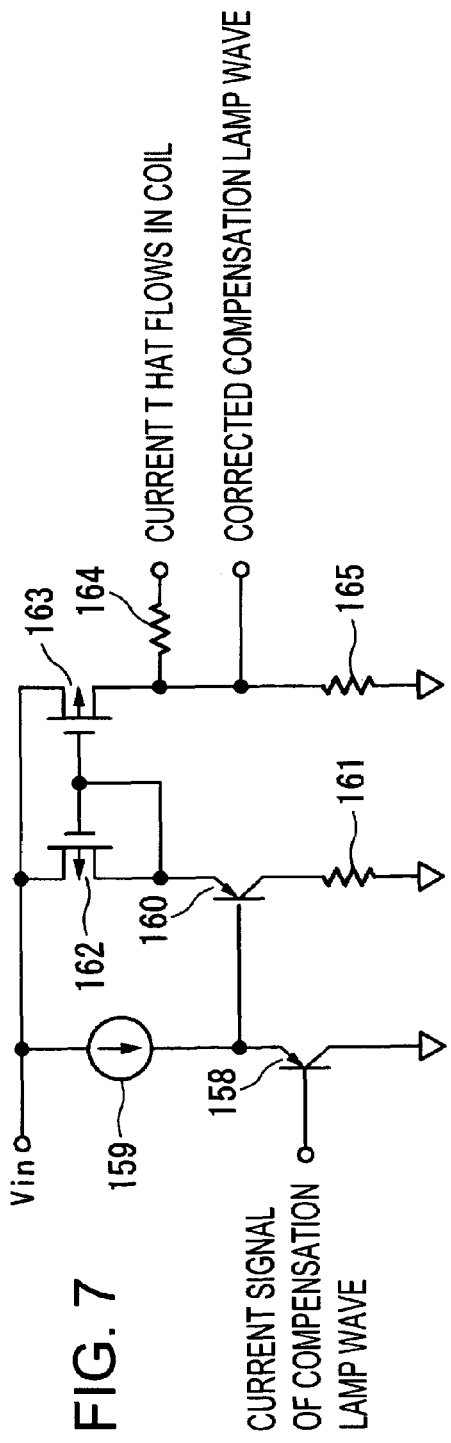
FIG. 7 is a conceptual diagram showing the structure of an adder shown in FIG. 6.
Figure 6:
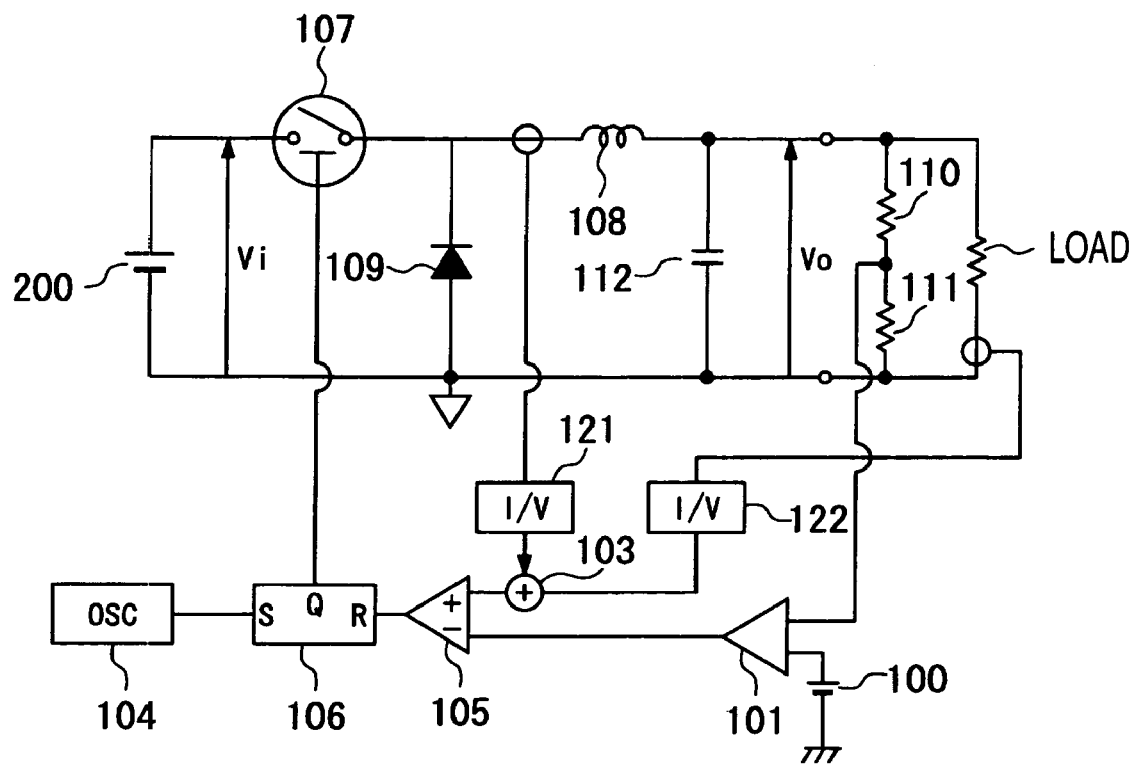
FIG. 6 is a conceptual diagram showing the structure of a conventional current mode switching regulator.

The resistor Rb has a resistance adjustable by trimming. For example, as shown in FIG. 5B, multiple resistors such as a resistor Rb1 of a resistance 2r, a resistor Rb2 of a resistance r, a resistor Rb3 of a resistance r/2, a resistor Rb4 of a resistance r/4, and the like are connected in series. Also, fuses Ha11, Ha12, Ha13, and Ha14 that bypass the respective resistors are connected in parallel to the resistor Rb1, the resistor Rb2, the resistor Rb3, the resistor Rb4, and the like, respectively. In this example, the resistor Rb1, the resistor Rb2, the resistor Rb3, and the resistor Rb4 are formed at the resistance ratio of 2:1/2:1/4:1/8, and the like, respectively. The fuses Hb1, Hb2, Hb3, Hb4, and the like are trimmed by laser as necessary to adjust the resistances. As described above, a composite resistance in which the resistors are connected in series can be adjusted to an arbitrary resistance by the combination of the cutting of the fuses in the trimming process, and a wide-range adjustment can be conducted.

The detector circuit 40 is made up of the p-channel transistor M40, and the resistor Ra2 having the same resistance as that of the resistor Ra1.

In this example, the p-channel transistor M40 is formed with the same transistor size and the same threshold voltage as those of the p-channel transistor M10. The p-channel transistor M40 has a source connected to the power supply wiring, a gate connected to the gate of the p-channel transistor M9, and a drain grounded through the resistor Ra2. The connection point between the drain of the p-channel transistor M40 and the resistor Ra2 is connected to a test terminal Ptest, and connected to a measurement pad on a chip. As a result, a voltage value at the connection point between the gate and the drain of the p-channel transistor M9, that is, a voltage at a terminal of the reference side of the second current mirror circuit (that is, a voltage value that is applied to the gates of the p-channel transistors M9 and M10 in the second current mirror circuit) can be detected by the measurement pad.

Subsequently, the operation of the adder 7 will be described with reference to FIG. 4. Because the first VI converter and the second VI converter are identical in structure with each other, the operation of the first VI converter will be representatively described below. The bias voltage of the first current mirror circuit is set by the constant voltage source 50, and a current of the current value I2 flows in the resistor R11 through the n-channel transistor M4. A composite current of a current that flows from the output terminal of the first current mirror circuit (that is, the drain of the p-channel transistor M8) and a current that flows from the terminal of the reference side of the second current mirror circuit (that is, the drain of the p-channel transistor M9) flows in the n-channel transistor M7 as a current value I1. The voltage of the second current mirror circuit is determined according to those current values I1 and I2.

In this example, when a voltage that is input from the terminal "a" is vi, the current I2 and the current I1 which flow in the first and second VI converters are represented by the following expressions.

$$I1 = (vi/r12) + (Vgs1/r12)$$

$$I2 = (Vgs3/r11)$$

where Vgs3 is a gate-source voltage of the p-channel transistor M3, Vgs1 is a gate-source voltage of the p-channel transistor M1. Also, r12 is a resistance of the resistor R12, r11 is a resistance of the resistor R11, and r11=r12.

$$Iout1 = I1 - I2 = (vi/r12) + (Vgs1/r12) - (Vgs2/r11)$$

Also, because the p-channel transistors M3 and M6 have the same transistor size and the same threshold voltage, and Vgs1=Vgs2 and r11=r12 are satisfied, the following expression is met.

$$Iout1 = (vi/r12)$$

The Iout1 is set by a ratio of the resistance r12 of the resistor R12 and the input voltage vi. As a result, a current of the current value Iout1 resulting from converting the sense voltage S1 into current is output from the first VI converter.

As described above, a current of the current value Iout2 resulting from converting the voltage of the compensation lamp wave into current is output from the second VI converter.

Then, the current value Iout obtained by adding the VI converted currents Iout1 and Iout2 which are output from the first VI converter and the second VI converter, respectively, flow in the resistor Ra1 and the resistor Rb, and the current added voltage is output to the non-inverting input terminal of the PWM comparator 6 as the slope compensated sense voltage.

Subsequently, a description will be given of the adjustment of the current capacity of the p-channel transistor M10 and the resistance of the resistor Rb.

In this case, in order to detect the voltage of the second current mirror circuit in the first VI converter, a ground voltage is applied to the terminal "b". As a result, because Iout2 becomes "0", Iout becomes only the component of Iout1, and whether the voltage value corresponding to the current value Iout1 is output or not is detected by a measurement pad.

In this situation, in the detector circuit 40, the resistance ra2 of the resistor Ra2 is identical with the resistance ra1 of the resistor Ra1. For that reason, the user who conducts the adjustment applies multiple different voltages to the terminal "a", and can detect a difference from the designed value designed in advance from a correspondence relationship of the applied voltage and the voltage that has been measured by the measurement pad in correspondence with the applied voltage.

According to the detection result, the adjustment value of the current capacity of the p-channel transistor M10 and the resistance rb of the resistor Rb is extracted from a predetermined correspondence table, and the p-channel transistor M10 and the resistor Rb are trimmed so as to reach the adjustment value. The correspondence table is measured under the experiments in advance, and in the multiple voltages that are applied to the respective terminals "a", as the correspondence of the applied voltage and the measured voltage as a pair, the combination of the p-channel transistor M10 and the fuse of the resistor Rb which is subjected to the necessary trimming process, that is, which is cut by laser, is shown in correspondence with the combination of those plural pairs.

Also, because the second VI converter is disposed close to the first VI converter in the layout and formed as the same characteristic, the p-channel transistor M30 is trimmed in the same manner as in the p-channel transistor M10.

With the above structure, the adder 7 according to this embodiment can realize the structure in which the sense voltage S1 and the voltage of the compensation lamp waveform are added only by the CMOS. As a result, in this embodiment, it is unnecessary to use the bipolar transistor or the bi CMOS transistor as in the conventional art, and the switching regulator can be easily manufactured by the normal CMOS process. For that reason, the switching regulator can be mounted in the logic circuit, the miniaturization can be conducted, and the manufacturing costs of the chip can be reduced as compared with the conventional example.

Hereinafter, a description will be given of the operation of the current mode step-down switching regulator shown in FIG. 1 including the operation of the adder 7 according to this embodiment with reference to FIGS. 1 and 2.

At a time t1, when the oscillator 8 outputs the clock signal as the pulse signal of H level, the PWM control circuit 9 transits the output terminal QB from H level to L level, and also transits the output terminal Q from H level to L level.

As a result, the p-channel transistor M1 is turned on, the n-channel transistor M2 is turned off, and the a drive current flows in the coil L from the power supply D1, thereby allowing the electric energy to be accumulated in the coil L.

In this situation, the slope compensation circuit 4 starts the output of the compensation lamp wave that changes linearly with the slope m (go up with the slop m in this embodiment) in synchronism with the clock signal.

Also, the p-channel transistor M12 and the p-channel transistor M9 input the control signal of L level to the gates to be turned on, respectively.

Also, the current sense circuit 5 detects the current that flows in the coil L, and outputs the sense voltage value S1 proportional to the current value.

Subsequently, the adder 7 adds the voltage value of the compensation lamp wave that is input to one input terminal "a" to the sense voltage S1 that is input from the input terminal "b", and outputs the addition result to the inverting input terminal of the PWM comparator 6 as the slope compensated sense voltage.

That is, in the adder 7, the voltage of the compensation slope wave is converted into the current value Iout1 by the first VI converter, the sense voltage S1 is converted into the current value Iout2 by the second VI converter, and the voltage resulting from subjecting the Iout obtained by adding the current values Iout1 and Iout2 to IV conversion by the aid of the resistors Ra1 and Rb is output to the non-inverting input terminal of the PWM comparator 6 as the addition result of the sense voltage S1 and the voltage value of the compensation slope wave.

As a result, the PWM comparator 6 compares the detected voltage that is input from the error amplifier 3 with the voltage obtained by slope-compensating the sense voltage S1 corresponding to the current that flows in the coil L by the compensation lamp wave, and feeds back the current value of the current that flows in the coil L in real time so as to output the PWM control signal that controls a period of time during which the p-channel transistor M1 is on.

At a time t2, the PWM comparator 6 transits the voltage of the output PWM control signal from L level to H level when the PWM comparator 6 detects that the voltage of the compensation lamp wave which linearly goes up with the slope m exceeds the output voltage of the error amplifier 3.

Then, the PWM control circuit 9 transits the voltage of the PWM control signal that is input from the PWM comparator 6 from L level to H level to transit the voltage output from the output terminal QB from L level to H level, and transits the voltage output from the output terminal Q from L level to H level. As a result, the p-channel transistor M1 is turned off, and the n-channel transistor M2 is turned on to discharge the electric energy that is accumulated in the coil L.

Subsequently, at a time t3, the slope compensation circuit 4 stops the output of the compensation lamp wave when the compensation lamp wave becomes a set maximum value.

As a result, the PWM comparator 6 transits the voltage of the output PWM control signal from H level to L level when the voltage of the compensation lamp wave becomes lower than the output voltage of the error amplifier 3.

Subsequently, at a time t4, the oscillator 8 outputs the clock signal, the subsequent cycle starts, and the operation of from the t1 to the time t4 is repeated as described above.

With the above structure, the current mode switching regulator semiconductor device according to this embodiment uses the CMOS structure that conducts the trimming adjustment as shown in the adder 7. Therefore, even if the threshold voltages of the respective transistors used in the first to fourth sub VI converters and the first to fourth current mirror circuits are varied, the voltage that is input from the detector circuit 40 is converted into the current by the detection pad, and the IV converted voltage is measured as the measurement voltage, thereby making it possible to detect the difference of the gain due to the threshold voltage on the basis of the measured detection voltage. Therefore, the current capacities of the p-channel transistors M10 and M30 and the resistance of the resistor Rb can be adjusted by trimming corresponding to the difference of the gain, and the adder 7 can be changed to a state where the voltage resulting from accurately adding the input voltage is obtained by the gain at the time of design.

Also, in this embodiment, the adder of the present invention has been described with reference to the current mode step-down switching regulator. Alternatively, the adder of the present invention can be used in a current mode step-up switching regulator.

What is claimed is:

1. An adder that converts a plurality of input voltages into currents, adds the currents obtained, converts the current added into a voltage, and outputs the voltage as an added result, comprising:
    a first VI converter that allows a first current corresponding to a voltage value of a first input voltage to flow;
    a second VI converter that allows a second current corresponding to a voltage value of a second input voltage to flow; and
    a current addition resistor having one end commonly connected to output terminals of the first VI converter and the second VI converter and another end grounded, which is adjustable in a resistance value,
    wherein each of the first VI converter and the second VI converter comprises:
        a prestage VI converter that generates a reference current;
        a poststage VI converter that generates a current corresponding to an input voltage;
        a first current mirror circuit having a first terminal on a reference side connected with the prestage VI converter and a first output terminal in which a current corresponding to the first terminal flows connected with the poststage VI converter; and
        a second current mirror circuit having a second terminal on a reference side connected with the first output terminal, which can adjust a ratio of a current that flows from a second output terminal in correspondence with a current that flows in the second terminal, and
    wherein the first current and the second current are allowed to flow to output a voltage generated on the one end of the current addition resistor as an addition voltage resulting from adding the first input voltage and the second input voltage together.

2. An adder according to claim 1, further comprising a detector circuit that detects the voltage at the second terminal of any one of the first VI converter and the second VI converter.

3. An adder according to claim 1, wherein in the first VI converter and the second VI converter:
    the prestage VI converter comprises:
        a first p-channel transistor having a source connected with a first constant current source and a gate and a drain grounded; and
        a first n-channel transistor having a gate connected to the source of the first p-channel transistor and a source grounded through a resistor;
    the poststage VI converter comprises:
        a second p-channel transistor having a source connected with a second constant current source, a gate applied with the input voltage, and a drain grounded; and
        a second n-channel transistor having a gate connected to the source of the second p-channel transistor and a source grounded through a resistor;
    the first current mirror circuit comprises:
        a third p-channel transistor having a source connected to a power supply, and a gate and a drain connected to a drain of the first n-channel transistor; and
        a fourth p-channel transistor having a source connected to the power supply, a gate connected to the gate of the third p-channel transistor, and a drain connected to a drain of the second n-channel transistor; and
    the second current mirror circuit comprises:
        a fifth p-channel transistor having a source connected to the power supply and a gate and a drain connected to the drain of the second n-channel transistor; and
        a sixth p-channel transistor having a source connected to the power supply, a gate connected to the gate of the fifth p-channel transistor, and a drain connected to one end of an adjustment resistor, which can adjust an amount of current.

4. An adder according to claim 2, wherein in the first VI converter and the second VI converter:
    the prestage VI converter comprises:
        a first p-channel transistor having a source connected with a first constant current source and a gate and a drain grounded; and
        a first n-channel transistor having a gate connected to the source of the first p-channel transistor and a source grounded through a resistor;
    the poststage VI converter comprises:
        a second p-channel transistor having a source connected with a second constant current source, a gate applied with the input voltage, and a drain grounded; and
        a second n-channel transistor having a gate connected to the source of the second p-channel transistor and a source grounded through a resistor;
    the first current mirror circuit comprises:
        a third p-channel transistor having a source connected to a power supply, and a gate and a drain connected to a drain of the first n-channel transistor; and
        a fourth p-channel transistor having a source connected to the power supply, a gate connected to the gate of the third p-channel transistor, and a drain connected to a drain of the second n-channel transistor; and
    the second current mirror circuit comprises:
        a fifth p-channel transistor having a source connected to the power supply and a gate and a drain connected to the drain of the second n-channel transistor; and
        a sixth p-channel transistor having a source connected to the power supply, a gate connected to the gate of the fifth p-channel transistor, and a drain connected to one end of an adjustment resistor, which can adjust an amount of current.

5. An adder according to claim 2, wherein the detector circuit comprises a seventh p-channel transistor having a source connected to a power supply, a gate connected to the gate of the sixth p-channel transistor, and a drain grounded through a resistor.

6. An adder according to claim 3, further comprising a detector circuit, wherein the detector circuit comprises a seventh p-channel transistor having a source connected to the power supply, a gate connected to the gate of the sixth p-channel transistor, and a drain grounded through a resistor.

7. An adder according to claim 4, wherein the detector circuit comprises a seventh p-channel transistor having a source connected to the power supply, a gate connected to the gate of the sixth p-channel transistor, and a drain grounded through a resistor.

8. A current mode switching regulator, comprising:
a slope compensation circuit that outputs a compensation lamp waveform for slope compensation;
a current detector circuit that detects a current that is supplied to a load to generate a sense voltage corresponding to the current;
an adder that adds a voltage of the compensation lamp waveform and the sense voltage together to generate a compensation sense voltage that has been subjected to slope correction; and
an output voltage control circuit that controls an output voltage by the compensation sense voltage,
wherein the adder according to claim 1 is employed as the adder.

* * * * *